United States Patent [19]
Orlomoski

[11] 3,882,917
[45]*May 13, 1975

[54] SELF-LOCKING THREAD

[75] Inventor: Roger W. Orlomoski, North Brookfield, Mass.

[73] Assignee: Litton Industrial Products, Inc., Holden, Mass.

[ * ] Notice: The portion of the term of this patent subsequent to June 30, 1987, has been disclaimed.

[22] Filed: Apr. 14, 1972

[21] Appl. No.: 243,932

Related U.S. Application Data

[63] Continuation-in-part of Ser. No. 26,529, April 3, 1970, abandoned, and a continuation-in-part of Ser. No. 734,833, May 3, 1968, Pat. No. 3,517,717, Continuation-in-part of Ser. No. 26,520, April 3, 1970, Pat. No. 3,653,241.

[52] U.S. Cl. ............................................. 151/22
[51] Int. Cl. .......................................... F16b 39/30
[58] Field of Search............ 151/22, 14 R; 10/10 R, 10/86 A; 85/46

[56] References Cited
UNITED STATES PATENTS

| 793,824 | 7/1905 | Culliney | 151/22 |
| 2,177,003 | 10/1939 | Purtell | 151/22 |
| 2,301,181 | 11/1942 | Ilsemann | 151/22 |
| 3,124,188 | 3/1964 | Muenchinger | 151/22 |
| 3,517,717 | 6/1970 | Orlomoski | 151/22 |

FOREIGN PATENTS OR APPLICATIONS 288,778  8/1961  Japan

Primary Examiner—Ramon S. Britts
Attorney, Agent, or Firm—Alan C. Rose; Joseph R. Spalla

[57] ABSTRACT

A self-locking threaded fastener having a relatively massive but bendable rib in one of the thread flanks which is adapted to engage the corresponding flank of a cooperating conventional thread with sufficient friction to prevent loosening of the self-locking thread.

18 Claims, 4 Drawing Figures

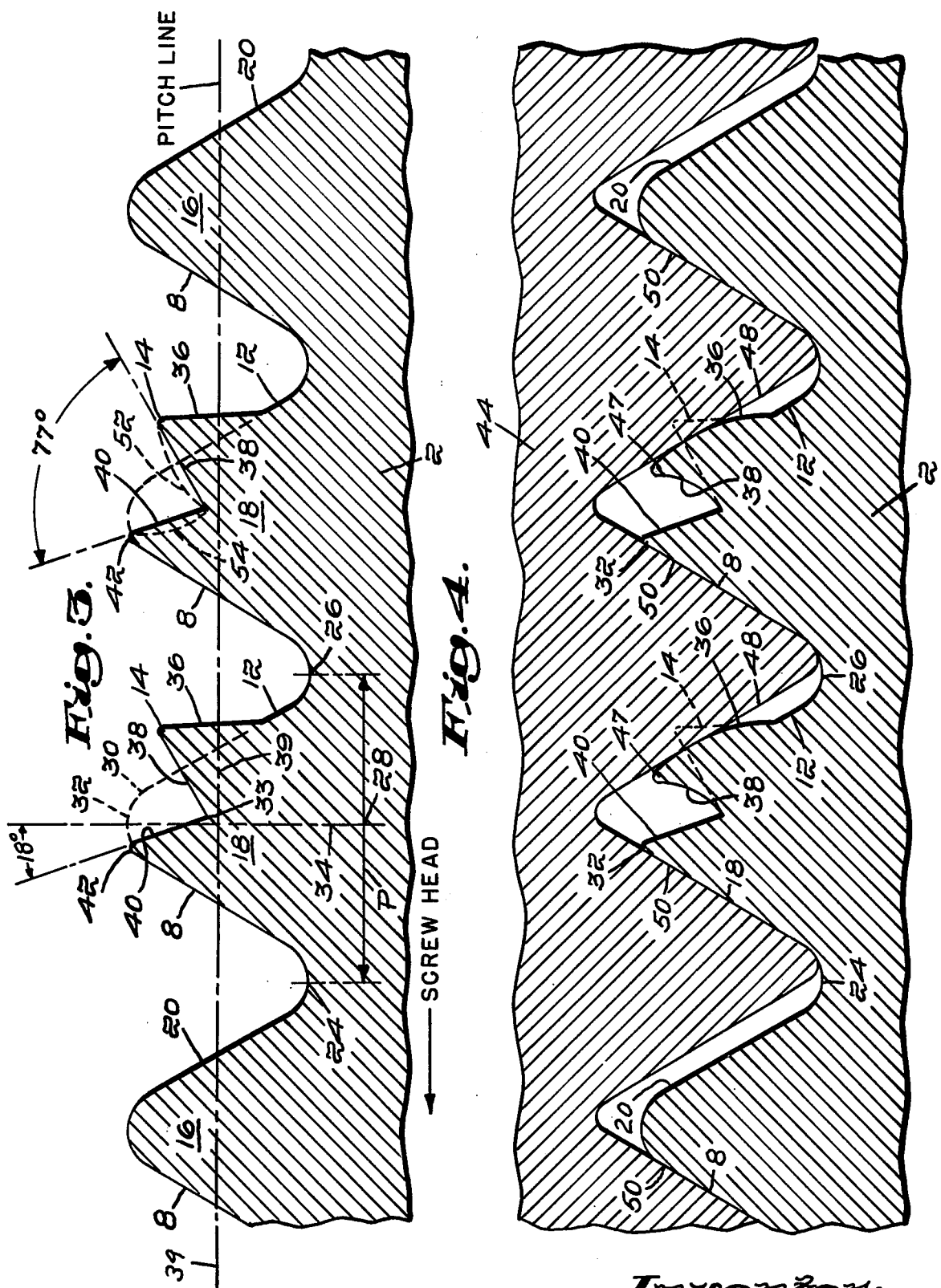

3,882,917

SELF-LOCKING THREAD

CROSS-REFERENCE TO RELATED APPLICATIONS

Reference is made to application Ser. No. 26,529, filed Apr. 3, 1970, now abandoned of which the present application is a Continuation in-part and the co-pending applications of Roger W. Orlomoski, Ser. No. 734,833, filed May 3, 1968, now U.S. Pat. No. 3,517,717, for SELF-LOCKING SCREWS and the Continuation-in-Part Application for DIES FOR MAKING SELF-LOCKING SCREWS AND METHODS OF MAKING SAME, filed Apr. 3, 1970, Ser. No. 26,520, now U.S. Pat. No. 3,653,241. The self-locking threads of the present application may be made through the use of the dies and method disclosed in the above referred to applications. The threads of this application are claimed broadly in the first of the two applications listed above, but specific claims to the additional novel and inventive features herein disclosed are made in this application. The co-pending application of Roger W. Orlomoski, Ser. No. 200,933, filed Nov. 22, 1971, for SELF-LOCKING SCREWS AND DIES FOR MAKING SCREWS teaches still another improvement in the self-locking thread in the above referred to application.

BACKGROUND OF THE INVENTION

The present invention is an improvement in the field of self-locking threads. Self-locking threads are old and well known in the fastening art. Standards have been established by the Locking Fastener Section of the Industrial Fasteners Institute for self-locking characteristics of prevailing torque type locking threads.

The prior art is extensive in this field with the most common form of self-locking threaded fastener being of the type which embodies in or between the threads some kind of yieldable non-metallic material that has been secured to the threads by a secondary operation. Other types are in the general class of deformed threads or mis-matched threads.

SUMMARY OF THE INVENTION

The present invention is of limited scope and constitutes an improvement over the prior art devices in that the rib that produces the self-locking ability of the thread is relatively massive in relation to the remaining undisturbed parts of the thread. The shape of the rib does not suggest that it would bend readily on insertion into a mating conventional thread in the manner required, but tests have shown that bending does occur with the production of more than ample friction to insure against release of the self-locking thread under operating conditions. The rib may be formed in either the pressure or nonpressure flank of the thread. Hereinafter, the description will be primarily of the preferred form in which the rib is in the non-pressure flank of a screw fastener.

DESCRIPTION OF THE DRAWINGS

FIG. 3 is an enlarged cross-sectional view of a portion of the threads and ribs shown in FIG. 1.

FIG. 4 is an enlarged cross-sectional view of a portion of the self-locking threads including the ribs on successive pitches in their cooperating position within a mating conventional thread.

DESCRIPTION OF THE PREFERRED EMBODIMENT

Figure 1:
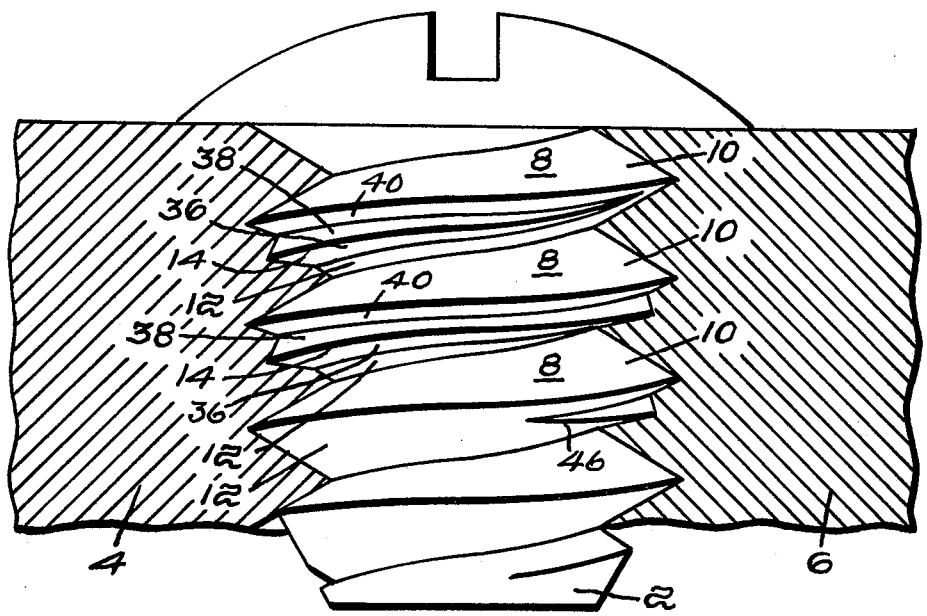
FIG. 1 shows the screw incorporating the invention. The threads and self-locking ribs are illustrated between dies by which they may be formed by thread rolling process.

In FIG. 1, a male self-locking threaded fastener or screw 2 is shown. This fastener may be of any length, diameter, pitch, material, and with or without a head. Ordinarily in the case of a male member the threads and the ribs thereon are formed by rolling a cylindrical workpiece between a pair of dies such as those suggested at 4 and 6. Such dies are shown and claimed in applicant's co-pending application Ser. No. 26,520, filed Apr. 3, 1970, the same day as the Ser. No. 26,529.

Figure 2:
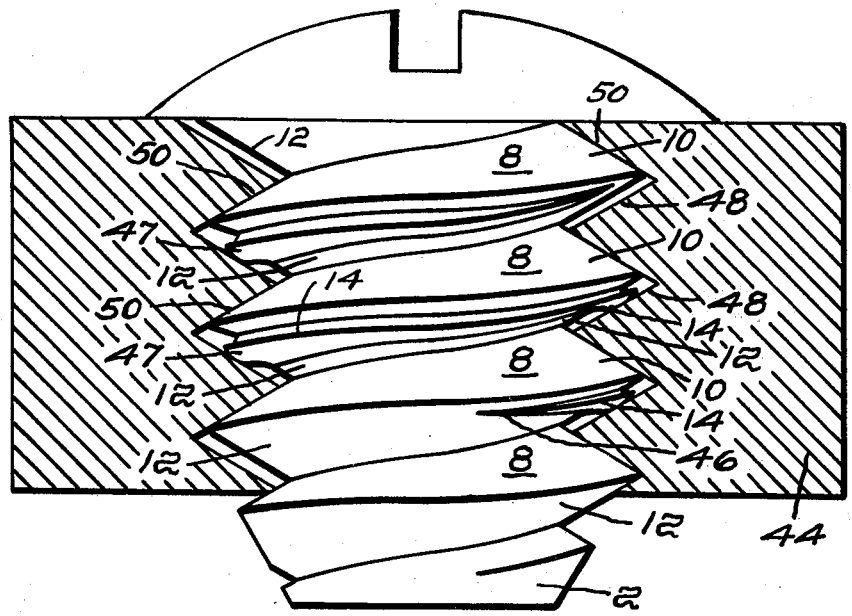
FIG. 2 shows the self-locking thread on a screw in engagement with a cooperating thread.

It will be seen from FIGS. 1 and 2 that the pressure flanks 8 of the threads 10 are conventional. The non-pressure flanks 12, however, include on some of the threads, ribs 14 which ribs are shown in greater detail in FIG. 3 which will now be referred to.

The view in FIG. 3 (an axial section) shows two conventional plan threads 16 and two threads 18 therebetween which include the self-locking ribs 14. The pressure flanks 8 are conventional. The non-pressure flanks 20 of threads 16 are likewise conventional. In the embodiment illustrated, the flanks 12 of threads 18 have been changed from their original plain condition which was like that of flanks 20 of threads 16 to the form which includes the ribs 14.

The ribs 14 are located in one flank only of the threaded fastener, which flank, preferably is the non-pressure flank. The ribs preferably may be continuous to extend for one or more pitches of the threaded fastener or the ribs may be discontinuous so that each rib 14 runs for less than 360°. The leading and trailing ends of the ribs, whether continuous or discontinuous, are preferably faired back into the flank 12 so that when the fastener is inserted into or unscrewed from a mating conventional thread, galling or gouging of the cooperating nut flank will be minimized.

When the term mating conventional thread is used herein, it is intended to mean a female threaded member into which a male member having a self-locking thread is to be threaded or a male threaded member about which a female member having a self-locking thread is to be threaded when so positioned to create the self-locking condition achieved by the frictional engagement of the bendable rib 14 with the cooperating conventional flank.

The line P in FIG. 3 represents a distance equal to the pitch of the screw threads and is the distance from root 24 to root 26 of adjacent threads. The point 28 on line P is midway between the roots 24 and 26. The dotted lines 30 shows the thread shape before formation of rib 14. The point 28 is radially directly below the original crest 32 of thread 18 and the dot-dash line 34 divides the original thread 18 into two halves.

In creating the rib 14 from the flank 12 of thread 18, tools in the form of dies 4 and 6 with ribs in the die threads shaped as shown in FIG. 1, initially engage the outer part of flank 12 of threads 18 close to the middle of the crests 32. The ribs on the dies are forced progressively into the rotating threads 18 causing cold flow of the thread metal to produce the final rib configuration shown in FIGS. 1 and 3. All of flank 12 has disappeared except for a small portion adjacent root 26.

Rib 14 has an outer wall 36 whose angularity is in a preferred form about 3° from the transverse plane illustrated by line 34. The radial width of wall 36 as shown is about one-half the depth of the thread. An inner wall 38 makes an angle of about 59° with line 34 and intersects wall 36 along an arcuate line which line is radially beyond the pitch line and considered in an axial direction is generally midway between the crest 32 and root 26 but preferably is somewhat closer to root 26 thereby to provide more rib mass exterior of the flank line. The included angle between walls 36 and 38 is about 62°. Inner wall 38 commences within flank 12 at a point 33 near line 34, and close to the pitch line 39. In order to have the massive rib 14, it is necessary that point 33 always be closer to line 34 than to the original flank line 30. A third wall 40 running from the inner edge of inner wall 38 slopes in the direction of the other flank 8 and in the construction shown in FIGS. 3 and 4 intersects flank 8 at approximately 180° to line 34. Thus, the cavity between inner walls 38 and 40 has an included angle of about 77°.

Sometimes, due to the particular hardness of the fastener material in relation to the rib forming tool, the inner wall 38 of the rib may flow in a manner to create a slightly convex surface in axial section as suggested by the dotted line 52 in FIG. 3. Similarly, the third wall 40 will assume a slightly concave surface in axial section as suggested by the dotted line 54. The operativeness of the invention is, however, unchanged by this variation.

While the recited angles are not critical within small limits, it is to be understood that the rib 14 herein disclosed is to be a relatively large, strong, not easily bent rib having a large included angle between the inner and outer walls 36 and 38 and having an inner wall whose inner edge is at a position preferably close to the mid point of the tooth.

The remaining portion of the crest 42 of thread 18 may be as shown in FIGS. 3 and 4 slightly to the left of line 34. This formation is the normal result when a large rugged rib such as rib 14 is created by dies 4 and 6 and when the inner edge of inner wall 38 is very close to line 34. When the original crest 32 was cut by the tool so as to form rib 14, the remaining part of the original crest material, moved to position 42 as shown in FIGS. 3 and 4, will not be moved beyond the line of flank 8 so there will be no detrimental change in the coaction of the other flank 8 with the corresponding pressure flank of the nut.

On the other hand, the original crest of the thread may remain in its original position in alignment with the transverse mid-section as illustrated in FIGS. 1 and 2. Whether the crest is moved slightly toward the other flank as at 42 in FIGS. 3 and 4 or remains in its original position as in FIGS. 1 and 2, depends on just where the die rib first engages the flank 12, the exact angle of the die rib wall that creates the third wall 40 and the characteristics of the metal of which the screw is made.

As plainly shown in the drawing, the cavity formed by the generation of the massive rib may be described as having a volume which will be not less than one quarter of the original volume of the thread radially outwardly of the pitch line.

Reference will now be made to FIGS. 2 and 4 which show what happens when the screw 2 is screwed to a properly sized cooperating female member or nut 44. Those skilled in the art will recognize that the male and female fasteners must have correct relative hardness according to well known standards.

The leading end 46 of rib 14 (FIG. 2) has been previously faired back into the non-pressure flank 12 to facilitate initial entry of rib 14 into the nut threads. As the rotation of the screw into the nut continues, the rib 14, despite its rugged formation, is bent by its engagement with nut flank 48 to assume the position generally shown at 47 in FIGS. 2 and 4. The friction developed between bent outer rib wall 36 and nut flank 48 as the pressure flank 8 is simultaneously urged against nut pressure flank 50 is sufficiently great to hold the screw in self-locking position within the nut.

When the screw is removed from the nut, the rib 14, which may or may not have been bent beyond its elastic limit, springs back toward its original shape to a greater or less degree. When the screw is reinserted in the same nut, substantially the same degree of self-locking will be reasserted.

The self-locking characteristics of this screw far exceed the standards of the Locking Fastener Section of the Industrial Fastener Institute.

Modifications and further applications of the invention will now be apparent to those skilled in the art without departing from the spirit of the invention. More particularly, the applications of the self-locking thread include screws, bolts, nuts and even pipe fittings. The preferred method of manufacturing the external self-locking thread herein is by a thread rolling process although various other means may be utilized for both internal and external threads.

I claim:

1. A self-locking thread characterized by a massive rib on one flank only of the thread, said rib having an outer wall commencing at the said one flank along an arcuate line intermediate the pitch line and root of said thread, said rib having an inner wall commencing nearer to the intersection of said pitch line and transverse mid-section of said thread than to the original line of said one flank, said outer and inner walls intersecting along an arcuate line substantially outside of the normal flank of said thread which line is generally midway in an axial direction between the root of said one flank and the crest of said one flank, and a third wall commencing at the inner edge of said inner wall, said third wall extending away from the thread axis and sloping toward said other flank and terminating at or close to said crest.

2. A self-locking thread as set forth in claim 1, said outer wall having a radial width equal to at least one half the depth of said thread.

3. A self-locking thread as set forth in claim 1, the included angle between said outer and inner walls being in the order of 62°.

4. A self-locking thread as set forth in claim 1, the said inner wall being slightly convex and the said third wall being slightly concave considered in an axial plane.

5. A self-locking thread as set forth in claim 1, said third wall, at some place in its width, intersecting the transverse plane that defines the mid-section of said thread.

6. A self-locking thread as set forth in claim 1, the intersection of said inner wall and said third wall defining a cavity having an included angle between the said walls of about 77°.

7. A self-locking thread as set forth in claim 6, said cavity equal in volume to not less than one quarter of the volume of said thread that is radially outward of said pitch line.

8. A self-locking thread as set forth in claim 1, the leading and trailing ends of said rib being faired into the surface of said non-pressure flank.

9. A self-locking thread characterized by a massive rib on one or more non-pressure flanks only, said rib being defined by an outer wall which is close to being at right angles to the thread axis and which commences on the root side of the pitch line of the thread and extends radially beyond the pitch line, said rib being further defined by an inner wall which is at 30° more or less to the thread axis and which is outside of said pitch line and which intersects said outer wall substantially beyond the normal flank of said thread to form an arcuate edge paralleling the thread crest, the leading and trailing ends of said rib being faired into the surface of said non-pressure flank, and a third wall starting at the inner edge of said inner wall and extending outwardly, said third wall being in part at least on the pressure flank side of the transverse plane that defines the mid-section of said thread.

10. A self-locking thread as set forth in claim 1, said outer wall being close to right angles to the thread axis and extending radially beyond the pitch line, said inner wall being at 30° more or less to the longitudinal axis of said self-locking thread, said inner wall further being outside of said pitch line and said arcuate line of intersection paralleling the thread crest.

11. A self-locking thread as set forth in claim 1, said rib being on the non-pressure flank of said thread.

12. A self-locking thread as set forth in claim 1, said rib being on the pressure flank of said thread.

13. A self-locking thread as set forth in claim 1, said outer wall extending radially beyond said pitch line.

14. A self-locking thread as set forth in claim 1, said arcuate intersecting line of said outer and inner walls being radially closer to said root than to said crest.

15. A self-locking thread as set forth in claim 1, said third wall intersecting said transverse mid-section and therebeyond intersecting said other flank whereby the said crest will be on the other flank side of said transverse mid-section.

16. A self-locking thread as set forth in claim 1, said arcuate line of intersection of said outer and inner walls considered in said axial direction being closer to said root than to said crest.

17. A self-locking thread characterized in that at least a part of one pitch of the threads is formed in the following configuration: that intermediate the crest and root there is present on only one flank of said thread a massive arcuate rib defined by an arcuate outer wall and an arcuate inner wall which walls intersect to form an arcuate outer edge exterior of the original line of said flank, said outer wall having an inner edge intersecting said flank along an arcuate line which is between the pitch line and the root of said thread, said inner wall having an inner arcuate edge within said flank which is closer to the mid-section of said thread than to the original line of said flank from which said rib extends, and a third wall extending radially outwardly sloping toward the other flank of said thread, said inner and third walls defining a space therebetween which extends well into the body of said thread, said outer edge, said inner edge of said outer wall and said inner edge of said inner wall all being concentric with said thread crest, said rib in radial cross-section being of generally triangular shape with the included angle between said outer and inner walls being greater than the included angle between said third wall and said other flank.

18. A self-locking thread having one or more spiraling ribs having outer and inner surfaces intersecting to form a spiraling edge, each said rib formed from an original flank and extending along and over at least a fraction of the flank, the rib being separated from the remaining thread by a spiraling groove formed between said inner surface of the rib and an inner surface of the remaining thread, the two inner surface meeting along a spiraling bottom of the groove which is between the axis of the thread and the said edge of the rib, characterized in that, over an extended range of axial cross-sections through the thread, the maximum width of the groove formed between the two inner surfaces exceeds the distance between the center plane of the thread and its original flank as measured along the pitch line, and said rib extending substantially beyond the normal flank of said thread.

* * * * *